United States Patent
Bose (10) Patent No.: US 8,554,980 B2
(45) Date of Patent: Oct. 8, 2013

(54) TRIGGERED NOTIFICATION

(75) Inventor: Patrick Glen Bose, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1340 days.

(21) Appl. No.: 11/556,123

(22) Filed: Nov. 2, 2006

(65) Prior Publication Data

US 2007/0115818 A1 May 24, 2007

Related U.S. Application Data

(60) Provisional application No. 60/733,822, filed on Nov. 4, 2005.

(51) Int. Cl.
*G06F 9/455* (2006.01)
*G06F 15/173* (2006.01)

(52) U.S. Cl.
USPC ............... 711/1; 709/223; 709/232; 709/234; 709/238

(58) Field of Classification Search
USPC .......................................... 370/230; 709/223
See application file for complete search history.

(56) References Cited

U.S. PATENT DOCUMENTS

| | | | |
|---|---|---|---|
| 6,628,663 B1 * | 9/2003 | Cromer et al. | 370/463 |
| 6,801,949 B1 * | 10/2004 | Bruck et al. | 709/232 |
| 2003/0074472 A1 * | 4/2003 | Lucco et al. | 709/245 |
| 2003/0145073 A1 * | 7/2003 | Lee | 709/223 |
| 2004/0090970 A1 * | 5/2004 | Sanchez et al. | 370/397 |
| 2004/0243650 A1 * | 12/2004 | McCrory et al. | 707/203 |
| 2005/0120160 A1 * | 6/2005 | Plouffe et al. | 711/1 |
| 2006/0184653 A1 * | 8/2006 | van Riel | 709/222 |
| 2007/0094367 A1 * | 4/2007 | Esfahany et al. | 709/223 |
| 2009/0028180 A1 * | 1/2009 | Strater et al. | 370/465 |
| 2012/0079368 A1 * | 3/2012 | Abdelaziz et al. | 715/234 |

* cited by examiner

*Primary Examiner* — Asad Nawaz
*Assistant Examiner* — Jason Harley
(74) *Attorney, Agent, or Firm* — Schwegman Lundberg & Woessner, P.A.

(57) ABSTRACT

In one embodiment, a virtual frame director may receive association data regarding a virtual server and a physical server, send instructions to a management module based on the received association data, send a control command to the physical server based on the received association data, and send a notification regarding completion of an association between the virtual server and the physical server. A management module may configure the virtual server and/or a gateway according to the instructions received from the virtual frame director. In one embodiment, a virtual frame director may receive a request message for a server, determine whether the request message for the server meets a policy implemented in the virtual frame director, and perform an action directed by the policy when the request message meets the policy.

17 Claims, 7 Drawing Sheets

TRIGGERED NOTIFICATION

PRIORITY CLAIM

This application claims the priority benefit of U.S. Provisional Application No. 60/733,822, filed 4 Nov. 2005, which is incorporated herein by reference.

TECHNICAL FIELD

This application relates generally to data processing systems and networking. More particularly, the present disclosure relates to the field of virtual servers.

BACKGROUND

A cluster of physical servers in a legacy (e.g., nonvirtual) environment were typically static and would be over provisioned to meet maximum demand for each application running on the cluster. The physical servers were generally intended to be available within the cluster to enable distribution of server load. When server load was low, servers in the cluster would be underutilized or not used. Configuration of the physical servers was performed manually such as based on internet protocol (IP) address.

BRIEF DESCRIPTION OF DRAWINGS

The particular embodiments of the invention are illustrated by way of example, and not limitation, in the figures of the accompanying drawings, in which like reference numerals indicate the same or similar features unless otherwise indicated.

In the drawings.

OVERVIEW

A method and system for triggered notification are described. In an example embodiment, a virtual frame director may receive association data regarding a virtual server and a physical server, send instructions to a management module based on the received association data, send a control command to the physical server based on the received association data, and send a notification regarding completion of an association between the virtual server and the physical server. A management module may configure the virtual server and/or a gateway according to the instructions received from the virtual frame director.

In an example embodiment, a virtual frame director may receive a request message for a server, determine whether the request message for the server meets a policy implemented in the virtual frame director, and perform an action directed by the policy when the request message meets the policy.

DESCRIPTION OF EXAMPLE EMBODIMENTS

A method and a system for triggered notification are described. In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter.

As described further below, according to various example embodiments of the disclosed subject matter described herein, there is provided a method and a system for triggered notification. The system can include a computer program embedded within the memory and executable by the processor, the computer program comprising instructions to implement a triggered notification system.

Figure 1:
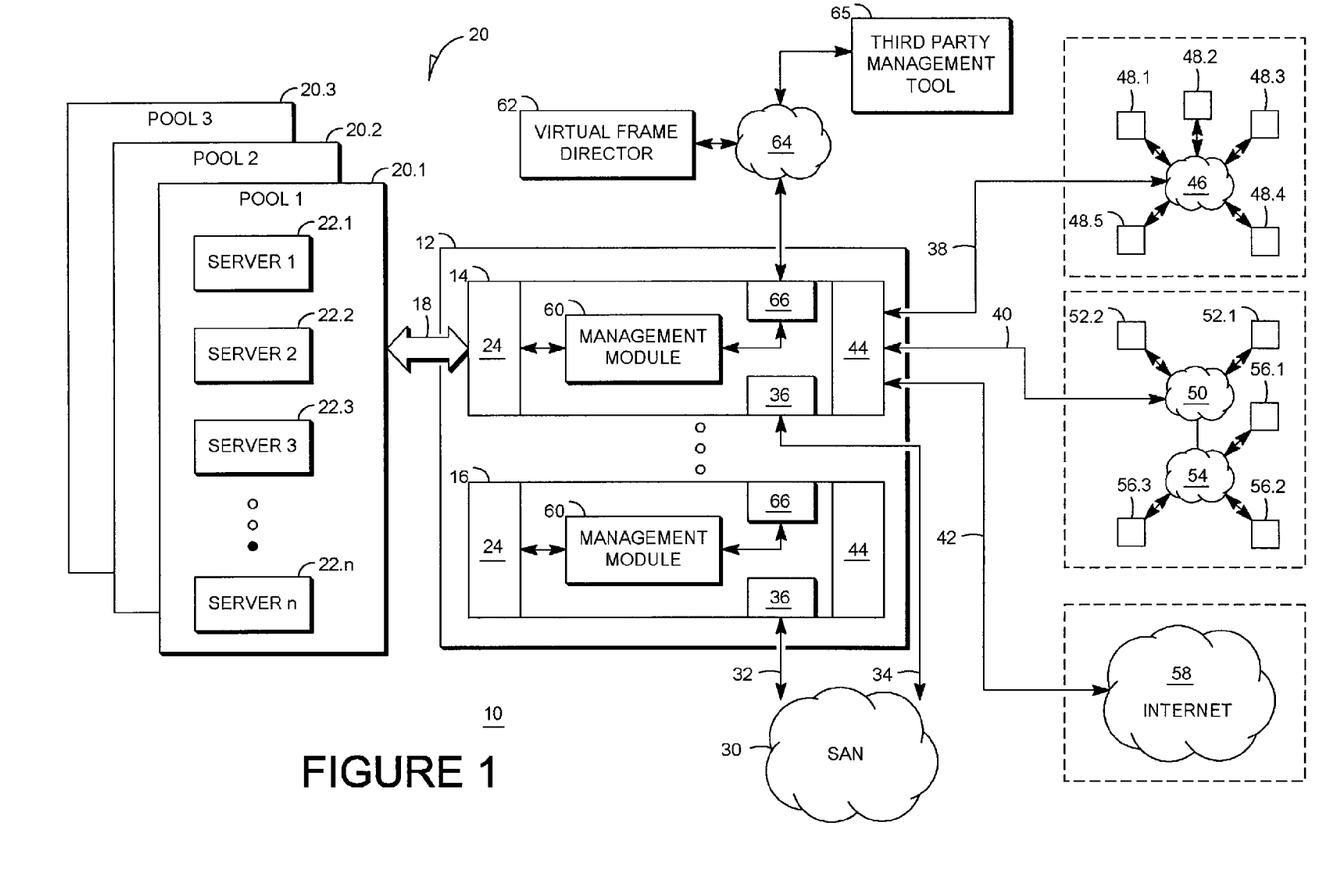
FIG. 1 shows example architecture of a virtual server system in accordance with an example embodiment.

Referring to FIG. 1, reference 10 generally illustrates a virtual server system (herein referred to by way of example as "VFrame") with associated hardware on which the virtual servers are deployed. The virtual server system 10 allows server personalities to be assigned to generic static servers over a server fabric switch. In an example embodiment, as the server personality is separated from the physical structure, it may be possible to provision virtual servers on-demand out of industry standard components. Each virtual server deployed on a physical server defines a state or personality of a physical server. This may include the logical definitions and configuration information stored in and used by a virtual frame director (described by way of example in more detail below) to program a server fabric as well as an OS and applications of the virtual server. The state or personality may be stored on a logical unit on a Storage Area Network, as described in more detail below. Thus, in FIG. 1, the example physical servers 22.1-22.*n* are the physical devices on which one or more virtual servers run. These physical servers include the CPU, memory, IO devices, and the like.

The system 10 is shown, by way of example, to include a switch group 12 including one or more switches 14, 16. The switch group 12 is connected, for example, via an InfiniBand link 18 (e.g., a switched fabric communications link) to one or more server pools 20. By way of example, three physical server pools 20.1-20.3 (on which the virtual servers are deployed) are shown in FIG. 1 but it will be appreciated that any number of server pools may be provided and that each server pool may have a different number of server blades, racks, or the like. Each server pool 20.1-20.3 is shown to include a plurality of physical servers 22.1-22.*n* linked via one or more InfiniBand links 18 to the switch group 12. Accordingly, when the link 18 is an InfiniBand link, each switch 14 may include an InfiniBand interface 24 to interface the server pools 20.1-20.3 to the switch group 12. The InfiniBand architecture or link may define a high speed network for interconnecting processing nodes and I/O nodes. In an Infini- Band network, processing nodes and I/O nodes are connected to the fabric by Host Channel Adapters (HCAs) and Target Channel Adapters (TCAs). It will however be appreciated that, in addition to instead of, the InfiniBand link 18 other links may be provided.

Figure 2:
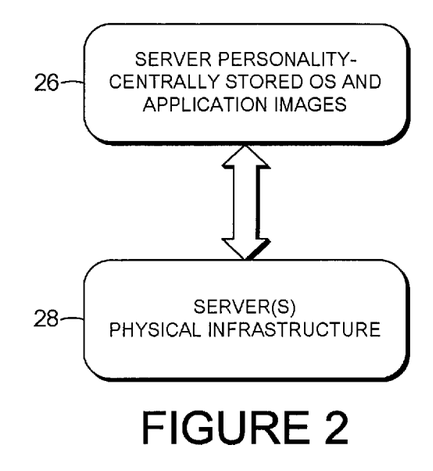
FIG. 2 shows separation of the physical infrastructure from the server personality of a server of the system of FIG. 1.

FIG. 2 shows that the personality of each server 22.1-22.*n* is separated from the physical servers or infrastructure (see blocks 26 and 28 in FIG. 2). For example, the personality of the servers 22.1-22.*n* (e.g., the operating system (OS), application image(s), or the like) may be stored remotely from the physical server infrastructure on a Storage Area Network (SAN) 30. In this example, the physical server infrastructure can be stateless computational resources with CPUs and memory. For example, as shown in FIG. 1, Storage Area Network (SAN) 30 (including one or more databases) may be provided to operate in conjunction with the physical servers 22.1-22.*n*. It will be appreciated that the SAN 30 may be a distributed data facility dispersed geographically. In an example embodiment, the SAN 30 is connected to the example switches 14, 16 via fibre channel connections 32, 34. Accordingly, each switch 14, 16 may include a fibre channel gateway 36. It will however be appreciated that in other embodiments, the switches 14, 16 may communicate with the SAN 30 via other channels in addition to, or instead of, the fibre channel gateway. The personalities or state of the virtual servers may be stored in a local database or on the SAN 30.

The switch 14 is shown to communicate with plurality of different networks (Local Area Networks, Wide Area Networks, or the like) via communication links 38, 40, 42. For example, the communication links 38, 40, 42 may be Ethernet connections and, accordingly, each switch 14, 16 may include one or more Ethernet gateways 44. In the example system 10, the communication link 38 is shown to connect to a network 46 interconnecting a plurality of hosts 48.1-48.5. The hosts 48.1-48.5 may form part of another data network, or be any other network host.

The switch 14 is also shown to communicate via the communication link 40 to a network 50 which may, for example, be an enterprise network. The network 50 is shown to communicate with desktop computers 52.1-52.2 and a subnet 54 which, in turn, is connected to desktop computers 56.1-56.3. Further, the switch 14 is also shown to connect via the communication link 42 to a network such as the Internet 58. It will however be appreciated that the aforementioned networks are merely example networks and different configurations and different numbers of networks and subnets may be provided that connect a wide range of network devices.

The system 10 may allow virtualization of servers deployed on physical servers that may be managed by a management module 60, which is shown, by way of example, to reside at the switch 14. It will, however, be appreciated that the management module 60 may reside in other components. The management module 60 communicates with a virtual frame director 62 that controls the provisioning of the server pools 20.1-20.3. In an example embodiment, the virtual frame director 62 communicates via a network 64 with the management module 60. The system 10 also includes a third party management tool 65 that communicates with the virtual frame director 62 and/or with the management module 60 to manage the provisioning of virtual servers. In an example embodiment, the network 64 is an Ethernet network and, accordingly, the switch 14 may thus include one or more Ethernet ports 66. It will however be appreciated that the various communication links linking the various components/devices in the system 10 are not restricted to InfiniBand connections, Ethernet connections, or the like. Any communication means may be provided to interconnect the various components.

Figure 3:
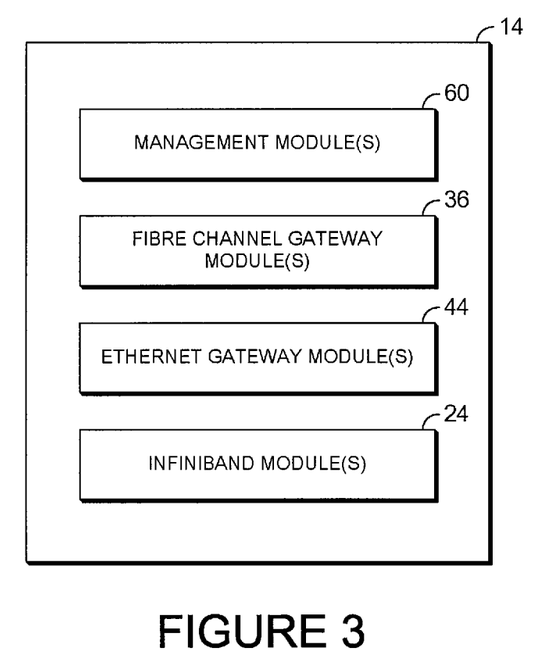
FIG. 3 shows a switch, in accordance with an example embodiment, deployed in the system.

Referring to FIG. 3, example modules of the switch 14 are shown. For example, the switch 14 is shown to include one or more management modules 60, one or more fibre channel gateway modules 36, one or more Ethernet gateway modules 44, and one or more InfiniBand modules 24. It will be appreciated that the modules 60, 36, 44, and 24 may include various electronic components to effect communication using the relevant protocols. In an example embodiment, the virtual frame director 62 of the system 10 allows software partners to program the switches 14, 16 with policies necessary to implement virtual servers on demand. For example, the third party management tool 65 may be used to accomplish this.

Figure 4:
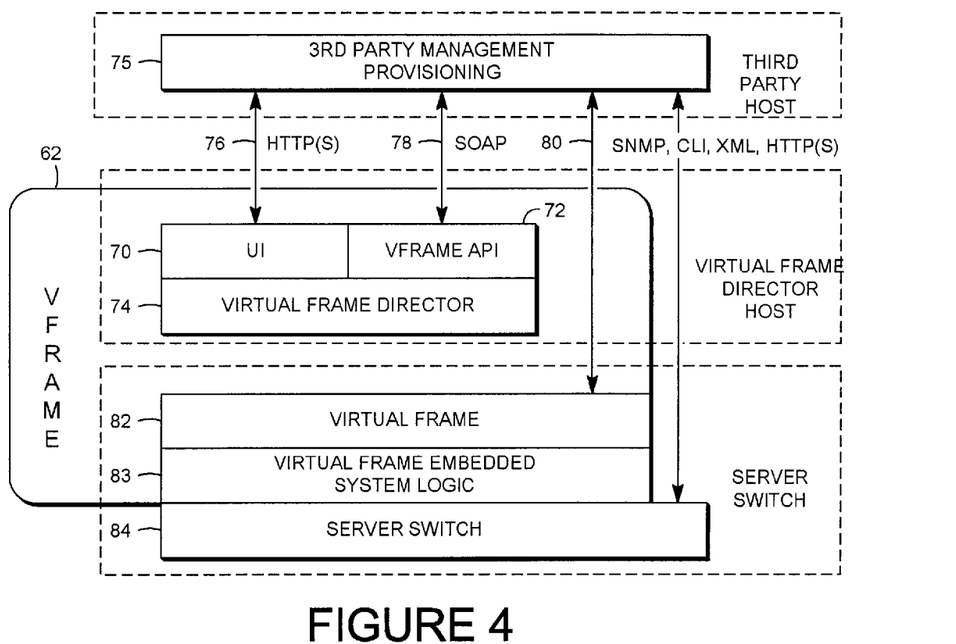
FIG. 4 shows example software architecture of a management module communicating with a third party management tool.

As shown by way of example in FIG. 4, logically the virtual frame director 62 (which may reside on a separate server) may include a user interface (UI) module 70, a virtual frame director Application Program Interface (API) 72 and a virtual frame (VFrame) director platform 74. The virtual frame director 62 may communicate with a third party management tool application 75 (see also third party management tool 65 in FIG. 1) via, for example, the network 64. In an example embodiment, the user interface module 70 communicates with the third party management and provisioning module 75 via an HTTP(s) link 76, a SOAP link 78, or the like. The third party management and provisioning module 75 is also shown to communicate via link 80 to a virtual frame platform 82. The server switch 14 is also shown to include embedded system logic 83 provided at a switch 84 (e.g., a switch 14, 16).

Figure 5:
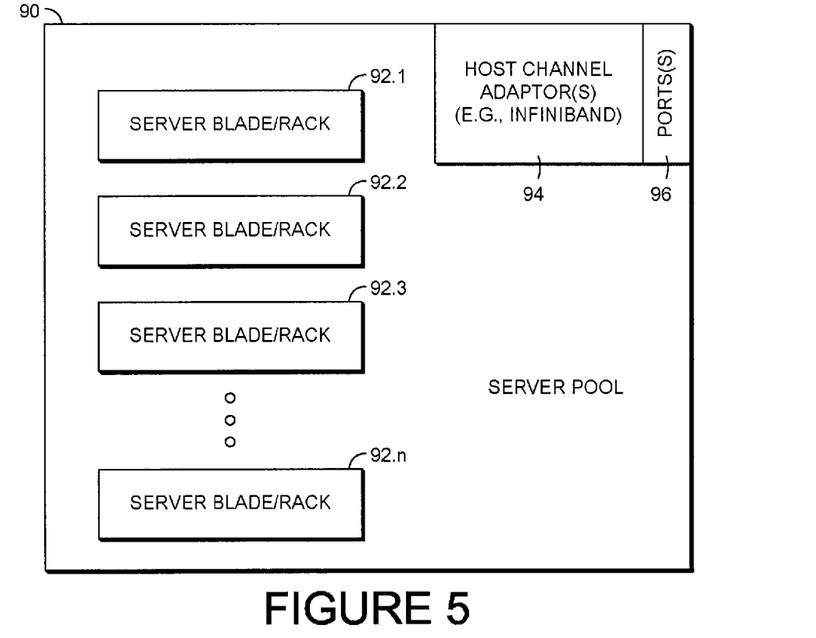
FIG. 5 shows a server pool, in accordance with an example embodiment, of the system of FIG. 1.

Referring to FIG. 5, reference 90 generally indicates an example server pool. The server pool 90 is shown to include a plurality of physical servers or server blades 92.1-92.*n* which each host one or more virtual servers. The servers 92.1-92.*n* may correspond to the servers 22.1-22.*n* in FIG. 1. In an example embodiment, in order to communicate via the communication link 18, each server pool 90 includes one or more host channel adapters (HCA) 94 (e.g., one or two HCAs per physical server) when deployed in an InfiniBand environment. Further, one or more ports 96 may be provided for communication via further communication protocols or channels. As mentioned above, the servers 92.1-92.*n* are physical servers. It will be appreciated that the virtual servers hosted on the physical servers may be defined by network configuration/logical definitions stored in a database of the virtual frame director 62 and a server state which is stored on networked storage.

Figure 6:
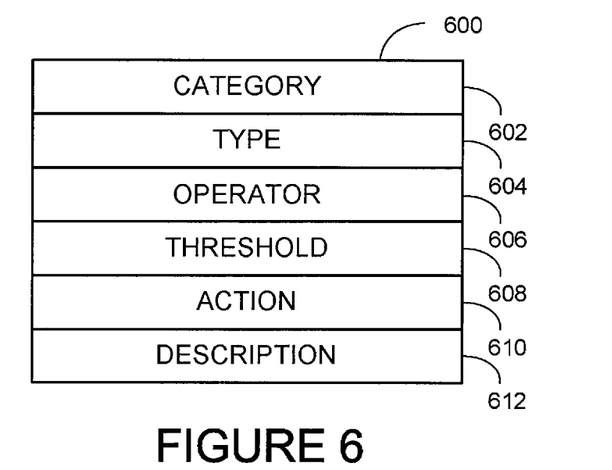
FIG. 6 is a block diagram of a policy data structure according to an example embodiment.

Referring to FIG. 6, a policy data structure 600 according to an example embodiment is illustrated. In an example embodiment, when the virtual frame director 62 (see FIG. 1) receives a request message for a virtual server (e.g., in the form of a trigger), the virtual frame director 62 may check against defined policies in the form of one or more of the policy data structures 600 to determine whether action should be taken. For example, a policy engine of the virtual frame director 62 may asynchronously process whether or not there is a matching policy and what action is directed based on the matching policy.

The policy data structure 600 may include a category field 602, a type field 604, an operator field 606, a threshold field 608, an action field 610, and a description field 612. The policy data structure 600 may represent a policy and include the fields 602-612 as attributes of the policy. The policy data structure 600 may optionally represent a SOAP trigger based policy, and the virtual frame director 62 may include a SOAP server listening for messages.

The category field 602 includes a variable name (e.g., an object ID) that is being monitored. For example, use of the category field 602 may allow multiple triggers to be defined for a single virtual server group 20.1-20.3 (see FIG. 1) by defining the subject of the expected messages. The category field 602 may include user-defined text.

The type field 604 instructs the virtual frame director 62 how to interpret (e.g., evaluate) the data that will be presented in incoming messages (e.g., request messages). The type field 604 may include a numeric value or text.

The operator field 606 defines how the incoming message should be compared to a threshold value of the threshold field 608. The operator field 606 may include values such as >, >=, <, <=, =, or contains, and the threshold field 608 may include user-defined text.

The action field 610 defines the changes the virtual frame director 62 can make to the environment (e.g., actions to be made) when the specified criteria are met. For example, the action field 610 may include actions such as "Send Email", "Add Server", "Remove Server", "Failover", "Reboot", or "Set VS State". In an example embodiment, the action field 610 may define association data such as may be accessed to direct the virtual frame director 62 for adding a server and removing a server.

The description field 612 may be for user reference in a user interface (UI) and log files. For example, the description field may include "CPU Load" to indicate to a user in the UI that CPU load is being monitored. The description field 612 may include user-defined text.

In an example embodiment, a name of a virtual server group may be implied (e.g., as it goes on the UI) for the policy data structure 600 as the policy is created for a particular virtual server group. For example, when a message is received, a policy is looked up so that the information may be correlated to a particular virtual server group.

By way of example, the policy data structure 600 may be for CPU load, where the CPU load is a numeric value. The policy may be written such that when the numeric value of CPU load is above a threshold (e.g., 13), a notification may be sent (e.g., to an administrator). If a CPU load message is then received where the value of CPU load is greater than the threshold (e.g., 40), a notification may be sent.

Figure 7:
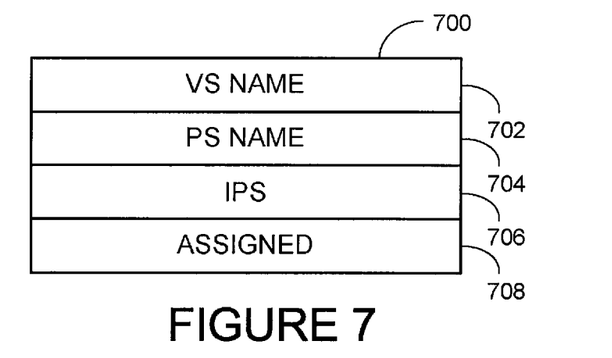
FIG. 7 is a block diagram of a notification data structure according to an example embodiment.

Referring to FIG. 7, a notification data structure 700 according to an example embodiment is illustrated. In an example embodiment, the notification data structure 700 may be a notification sent from virtual frame director 62 (see FIG. 1) regarding an association between a physical server and a virtual server.

The notification data structure 700 may include a virtual server (VS) name field 702, a physical server (PS) name field 704, an internet protocols (IPs) field 706, and an assigned field 708.

The VS name field 702 has a name of the virtual server associated with the notification, and the PS name field 704 has a name of the physical server associated with the notification. Both the VS name field 702 and the PS name field 704 may store a string. The name fields 702, 704 may refer to the names of the virtual and physical servers as presented in the user interface (UI).

The IPs field 706 may be an array of the IP interfaces for the given virtual server and a name (or alias) may correspond to an alias as listed in the UI. The IP address may be the corresponding IP for that alias. The information contained in the IPs field 706 may optionally be used by third parties to manage the new resources.

The assigned field 708 indicates association between the physical service and a virtual server. For example, the assigned field 708 may reflect that the physical server has been assigned (e.g., a virtual server to a physical server association) or unassigned (e.g., a virtual server to a physical server disassociation). The assigned field 708 may optionally contain a Boolean value where a value of true indicates assignment and a value of false indicates unassignment.

In an example embodiment, no response message is sent. Further no error codes may be provided and any errors encountered may be logged by the virtual frame director 62 and may not affect the assignment procedure.

In an example embodiment, an API for sending the notification may be:

```
<?xml version="1.0" encoding="UTF-8"?>
<wsdl:definitions targetNamespace="http://vm:8080/services/VFrameListener"
xmlns="http://schemas.xmlsoap.org/wsdl/"
xmlns:apachesoap="http://xml.apache.org/xml-soap"
xmlns:impl="http://vm:8080/services/VFrameListener"
xmlns:intf="http://vm:8080/services/VFrameListener"
xmlns:soapenc="http://schemas.xmlsoap.org/soap/encoding/"
xmlns:tns1="http://net.jboss.org/jmx" xmlns:tns2="VFrame"
xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema"><wsdl:types><schema
targetNamespace="http://net.jboss.org/jmx"
xmlns="http://www.w3.org/2001/XMLSchema"><import
namespace="http://schemas.xmlsoap.org/soap/encoding/"/><complexType
name="ObjectNameType"><simpleContent><extension
base="string"/></simpleContent></complexType><complexType
name="AttributeType"><attribute name="name"
type="xsd:string"/><complexContent><sequence><element name="value"
nillable="true"
type="xsd:anyType"/></sequence></complexContent></complexType></schema>
<schema targetNamespace="VFrame"
xmlns="http://www.w3.org/2001/XMLSchema"><import
namespace="http://schemas.xmlsoap.org/soap/encoding/"/><complexType
name="IPIntf"><sequence><element name="alias" nillable="true"
type="xsd:string"/><element name="ipAddress" nillable="true"
type="xsd:string"/></sequence></complexType><complexType
name="TriggerError"><sequence><element name="code"
type="xsd:int"/><element name="message" nillable="true"
type="xsd:string"/></sequence></complexType></schema><schema
targetNamespace="http://vm:8080/services/VFrameListener"
```

-continued

```
xmlns="http://www.w3.org/2001/XMLSchema"><import
namespace="http://schemas.xmlsoap.org/soap/encoding/"/><complexType
name="ArrayOf_tns2_IPIntf"><complexContent><restriction
base="soapenc:Array"><attribute ref="soapenc:arrayType"
wsdl:arrayType="tns2:IPIntf[ ]"/></restriction></complexContent></complexType>
</schema></wsdl:types>
    <wsdl:message name="assignedServerRequest">
        <wsdl:part name="assigned" type="xsd:boolean"/>
        <wsdl:part name="vsName" type="xsd:string"/>
        <wsdl:part name="psName" type="xsd:string"/>
        <wsdl:part name="ips" type="impl:ArrayOf_tns2_IPIntf"/>
    </wsdl:message>
    <wsdl:message name="assignedServerResponse">
    </wsdl:message>
    <wsdl:portType name="VFrameSOAPListener">
        <wsdl:operation name="assignedServer" parameterOrder="assigned vsName
psName ips">
            <wsdl:input message="impl:assignedServerRequest"
name="assignedServerRequest"/>
            <wsdl:output message="impl:assignedServerResponse"
name="assignedServerResponse"/>
        </wsdl:operation>
    </wsdl:portType>
    <wsdl:binding name="VFrameListenerSoapBinding"
type="impl:VFrameSOAPListener">
        <wsdlsoap:binding style="rpc"
transport="http://schemas.xmlsoap.org/soap/http"/>
        <wsdl:operation name="assignedServer">
            <wsdlsoap:operation soapAction=""/>
            <wsdl:input name="assignedServerRequest">
                <wsdlsoap:body encodingStyle="http://schemas.xmlsoap.org/soap/encoding/"
namespace="http://policy.vframe.topspin.com" use="encoded"/>
            </wsdl:input>
            <wsdl:output name="assignedServerResponse">
                <wsdlsoap:body encodingStyle="http://schemas.xmlsoap.org/soap/encoding/"
namespace="http://vm:8080/services/VFrameListener" use="encoded"/>
            </wsdl:output>
        </wsdl:operation>
    </wsdl:binding>
    <wsdl:service name="VFrameSOAPListenerService">
        <wsdl:port binding="impl:VFrameListenerSoapBinding"
name="VFrameListener">
            <wsdlsoap:address location="http://vm:8080/services/VFrameListener"/>
        </wsdl:port>
    </wsdl:service>
</wsdl:definitions>
```

Figure 8:
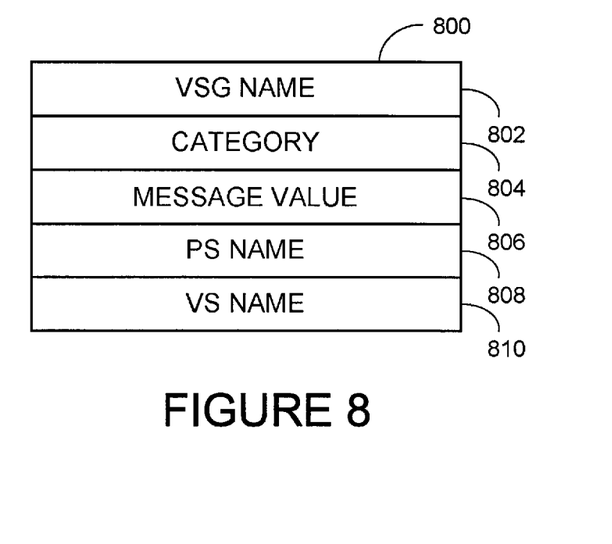
FIG. 8 is a block diagram of request message data structure according to an example embodiment.

Referring to FIG. 8, a request message data structure 800 according to an example embodiment is illustrated. In an example embodiment, the request message data structure 800 may be sent to the virtual frame director 62 as a request message (e.g., a trigger).

The request message data structure 800 may include a virtual server group (VSG) name field 802, a category field 804, a message value field 806, an optional physical server (PS) name field 808, and an optional virtual server (VS) name field 810. The fields 802-810 of the request message data structure 800 may each retain text in the form of a string.

The VSG name field 802 has a name of the virtual server group for which a policy was defined.

The category field 804 has a category of the request message. For example, the category of the request message may match a category of the category field 602 of the policy data structure 600 (see FIG. 6) to enable action directed by the policy to be performed when the request message meets the policy.

The message value field 806 has a current value for the category to be compared to the threshold (e.g., the value contained in the threshold field 608 for a matching category field 602). By way of example, if the category contained within the category field 804 is "CPU load", the message value field 806 may have a value of 13.

A name of a physical server and/or a virtual server may optionally be specified by the PS name field 808 and the VS name field 810 respectively. The use of the optional fields 808, 810 may allow for flexibility to define both group level and server specific policies. For example, if there is a policy for rebooting, the request message data structure 800 may indicate a specific server to reboot as opposed to rebooting an entire web cluster.

By way of a further example, when defining a policy to add more physical servers when load is high (e.g., based on cluster load), the physical servers need not be specified. In this example scenario, the group may be considered as a unit. However, if a service failure has been detected and rebooting of a specific server is required, the extra information (e.g., by completing the PS name field 808 and/or VS name field 810) may be used. For example, based on the policy another server may be added to the cluster or a server may be unassigned in response to the request message received. The use of the policies and triggers may enable virtual servers to be brought up, patched, and shut down.

Failure to include the extra information may result in a policy action (e.g., of the action field 610 of FIG. 6) failing due to insufficient information to complete the request. Example error codes may be sent from the virtual frame director 62 in response to a received request message data structure 800. For example, the error codes may be a numeric value, and a description of the error such as the following example descriptions:
1—Specified virtual server group not found.
2—Specified virtual server not found.
3—Specified physical server not found.

In an example embodiment, no response message (or a message received confirmation) may sent by the virtual frame director 62 in response to receipt of the request message data structure 800 and if an error message is not received, this may be considered as confirmation that the policy engine has received the input.

In an example embodiment, the request message data structure 800 may be a SOAP-based trigger web services definition language (WSDL) as follows:

```
<?xml version="1.0" encoding="UTF-8"?>
<wsdl:definitions targetNamespace="http://vm:8080/services/VFrame"
xmlns="http://schemas.xmlsoap.org/wsdl/"
xmlns:apachesoap="http://xml.apache.org/xml-soap"
xmlns:impl="http://vm:8080/services/VFrame"
xmlns:intf="http://vm:8080/services/VFrame"
xmlns:soapenc="http://schemas.xmlsoap.org/soap/encoding/"
xmlns:tns1="http://net.jboss.org/jmx" xmlns:tns2="VFrame"
xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema"><wsdl:types><schema
targetNamespace="http://net.jboss.org/jmx"
xmlns-"http://www.w3.org/2001/XMLSchema"><import
namespace="http://schemas.xmlsoap.org/soap/encoding/"/><complexType
name="ObjectNameType"><simpleContent><extension
base="string"/></simpleContent></complexType><complexType
name="AttributeType"><attribute name="name"
type="xsd:string"/><complexContent><sequence><element name="value"
nillable="true"
type="xsd:anyType"/><sequence></complexContent></complexType></schema>
<schema targetNamespace="VFrame"
xmlns="http://www.w3.org/2001/XMLSchema"><import
namespace="http://schemas.xmlsoap.org/soap/encoding/"/><complexType
name="IPIntf"><sequence><element name="alias" nillable="true"
type="xsd:string"/><element name="ipAddress" nillable="true"
type="xsd:string"/></sequence></complexType><complexType
name="TriggerError"><sequence><element name="code"
type="xsd:int"/><element name="message" nillable="true"
type="xsd:string"/></sequence></complexType></schema></wsdl:types>
    <wsdl:message name="SOAPTriggerException">
        <wsdl:part name="fault" type="tns2:TriggerError"/>
    </wsdl:message>
    <wsdl:message name="sendMessageResponse">
    </wsdl:message>
    <wsdl:message name="sendMessageRequest">
        <wsdl:part name="vsgName" type="xsd:string"/>
        <wsdl:part name="category" type="xsd:string"/>
        <wsdl:part name="message" type="xsd:string"/>
        <wsdl:part name="psName" type="xsd:string"/>
        <wsdl:part name="vsName" type="xsd:string"/>
    </wsdl:message>
    <wsdl:portType name="SOAPTrigger">
        <wsdl:operation name="sendMessage" parameterOrder="vsgName category
message psName vsName">
            <wsdl:input message="impl:sendMessageRequest"
name="sendMessageRequest"/>
            <wsdl:output message="impl:sendMessageResponse"
name="sendMessageResponse"/>
            <wsdl:fault message="impl:SOAPTriggerException"
name="SOAPTriggerException"/>
        </wsdl:operation>
    </wsdl:portType>
    <wsdl:binding name="VFrameSoapBinding" type="impl:SOAPTrigger">
        <wsdlsoap:binding style="rpc"
transport="http://schemas.xmlsoap.org/soap/http"/>
        <wsdl:operation name="sendMessage">
            <wsdlsoap:operation soapAction=""/>
            <wsdl:input name="sendMessageRequest">
                <wsdlsoap:body encodingStyle="http://schemas.xmlsoap.org/soap/encoding/"
namespace="http://policy.vframe.topspin.com" use="encoded"/>
            </wsdl:input>
            <wsdl:output name="sendMessageResponse">
                <wsdlsoap:body encodingStyle="http://schemas.xmlsoap.org/soap/encoding/"
namespace="http://vm:8080/services/VFrame" use="encoded"/>
            </wsdl:output>
            <wsdl:fault name="SOAPTriggerException">
```

-continued

```
            <wsdlsoap:fault encodingStyle="http://schemas.xmlsoap.org/soap/encoding/"
namespace="http://vm:8080/services/VFrame" use="encoded"/>
          </wsdl:fault>
        </wsdl:operation>
    </wsdl:binding>
    <wsdl:service name="SOAPTriggerService">
        <wsdl:port binding="impl:VFrameSoapBinding" name="VFrame">
          <wsdlsoap:address location="http://vm:8080/services/VFrame"/>
        </wsdl:port>
    </wsdl:service>
</wsdl:definitions>
```

It should be appreciated the field is an example type of a data structure input of the data structures 600, 700, and 800 (see FIGS. 6-8). Other inputs may be used instead of and/or in addition to the fields, and other configurations of the data structures 600, 700, and 800 may also be used.

Figure 9:
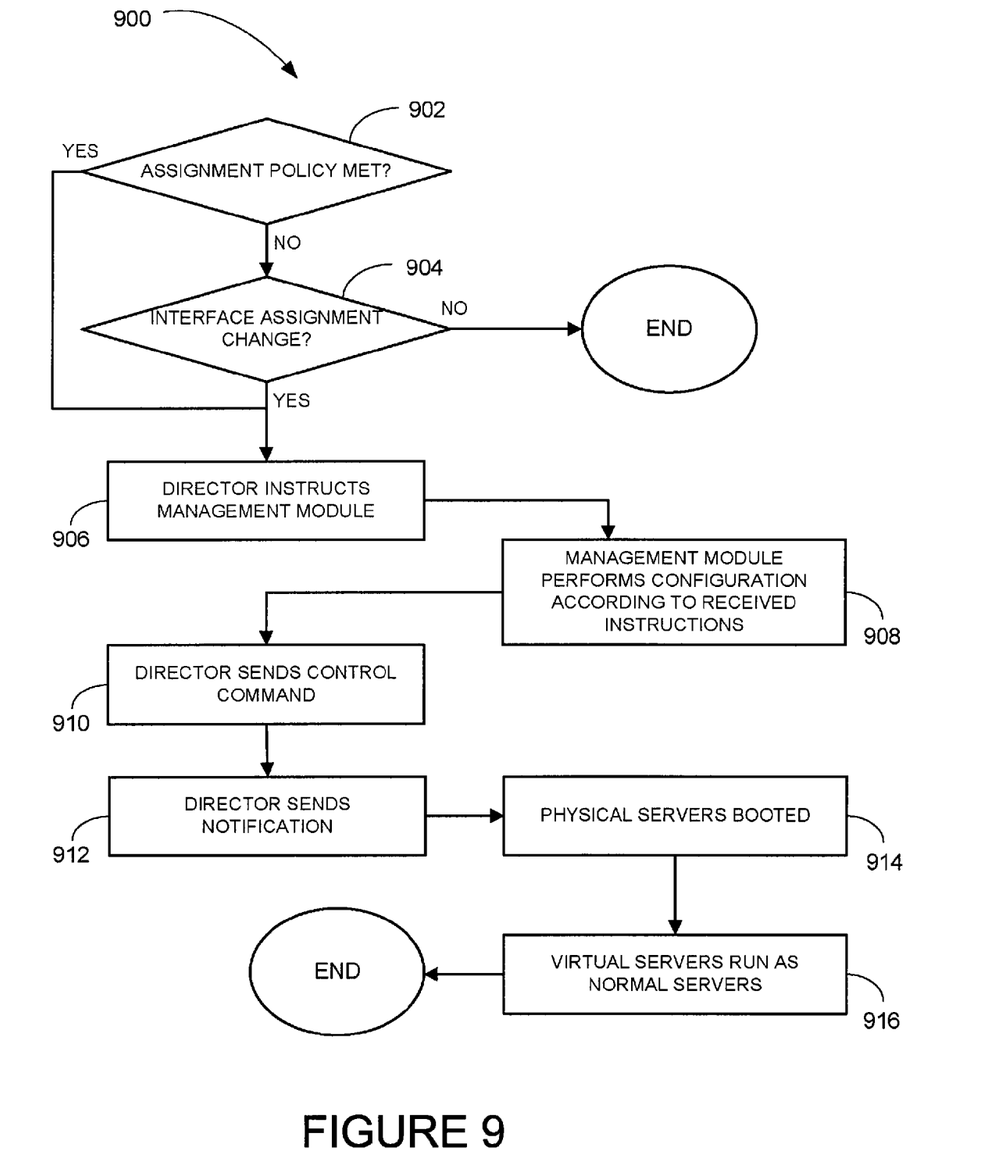
FIG. 9 is a flowchart illustrating a method for communicating notifications in a virtual server environment.

Referring to FIG. 9, a method 900 for communicating notifications in a virtual server environment according to an example embodiment is illustrated. In an example embodiment, the notification may be a message sent by the virtual frame director 62 to the third party management tool 65 (see FIG. 1).

In an example embodiment, as described in more detail below, SOAP notifications are communicated between various nodes or devices. The method 900 may be deployed in the system 10 and, accordingly, is described with reference thereto.

At decision block 902, a determination may be made as to whether an assignment policy is met. For example, the assignment policy may be defined by the policy data structure 600 (see FIG. 6) and includes association data. If the assignment policy is met, the method 900 may proceed to block 906. For example, if a defined policy is for load monitoring and a CPU load exceeds a threshold, the method 900 may perform an action dictated by the association data of the policy (e.g., as may be defined in the action field 610 of FIG. 6).

If the assignment policy is not met (e.g., no assignment policy is applicable) at decision block 902, the method 900 may proceed to decision block 904. A determination may be made at decision block 904 as to whether an assignment change has been received through a user interface. For example, the assignment change may be association data in which one or more virtual servers are associated with one or more physical servers. The user interface may also allow an administrator to define rules or policies associated with the virtual servers (e.g., server 20 in FIG. 1). In addition or instead, physical servers may be automatically associated with virtual servers and a reference database may provide policy and/or rules that may be associated with the virtual servers. If the assignment change has not been received at decision block 904, the method 900 may terminate. If the assignment change has been received at decision block 904, the method 900 may proceed to block 906.

A director may instruct the management module 60 (see FIG. 1) based on association data (e.g., assignment policy and/or assignment change) received at block 906.

The management module 60 may perform configuration according to received instructions at block 908. For example, the management module 60 may configure a gateway (e.g., fibre channel addresses, fibre channel gateways, Ethernet gateways, or the like depending on the type of links used) according to the received instructions.

The director may then send a control command at block 910. For example, the control command may boot up or power down servers.

The director may send a notification at block 912, which may in the form of the notification data structure 700 (see FIG. 7). For example, the virtual frame director 62 may also notify applications when a physical server has been added to or removed from a virtual server group (e.g., the server groups or pools 20.1-20.3. The notification may be sent to indicate the assignment or unassignment of a server and may optionally include the IP addresses of the server. A receiver of the notification may be monitoring the director so that the receiver may use the IP interface to look up a machine associated with the notification so that appropriate action may be taken. For example, an administrator may be notified if the notification was unexpected and the administrator may not be notified if the notification was expected (e.g., part of normal server operations).

The virtual frame director 62 may send out notifications using SOAP. In an example embodiment, interested parties must register the URL of their SOAP endpoint with the virtual frame director 62 to receive these notifications. In order to do this, the endpoint may implement a listener service.

The physical servers may be booted at block 914 and the virtual servers may then function as normal servers (e.g., running whatever particular application for which they have been configured) at block 916.

In an example embodiment, third party applications can tie into the system 10 to dynamically scale virtual server groups on demand. This interaction may be based on a loosely coupled, bidirectional signaling using web services. For example, third parties may send status information into policy engine of the virtual frame director 62 (or located in another component) via SOAP-based triggers. This information may be interpreted by the policy engine to determine what actions should be taken such as adding or removing physical servers to a virtual server group or pool 20.1-20.3. As mentioned above, in an example embodiment, SOAP (Simple Object Access Protocol) is used. For example, SOAP is a lightweight XML-based messaging protocol used to encode the information in Web service request and response messages before sending them over a network. SOAP messages are independent of any operating system or protocol and may be transported using a variety of Internet protocols, including SMTP, MIME, and HTTP.

In order for third party applications to make use of newly provisioned resources, the virtual frame director 62 notifies registered parties/devices when servers are added or removed from a virtual server group or pool 20.1-20.3. These communications may be implemented as SOAP 1.1 based web services. Thus, SOAP may be used as an XML-based communications protocol for cross-platform application integration. The virtual frame director 62 may send and receive SOAP messages over HTTP.

In an example embodiment, WSDL (Web Service Description Language) may be used for automated generation of stubs and skeletons used by the external applications.

Figure 10:
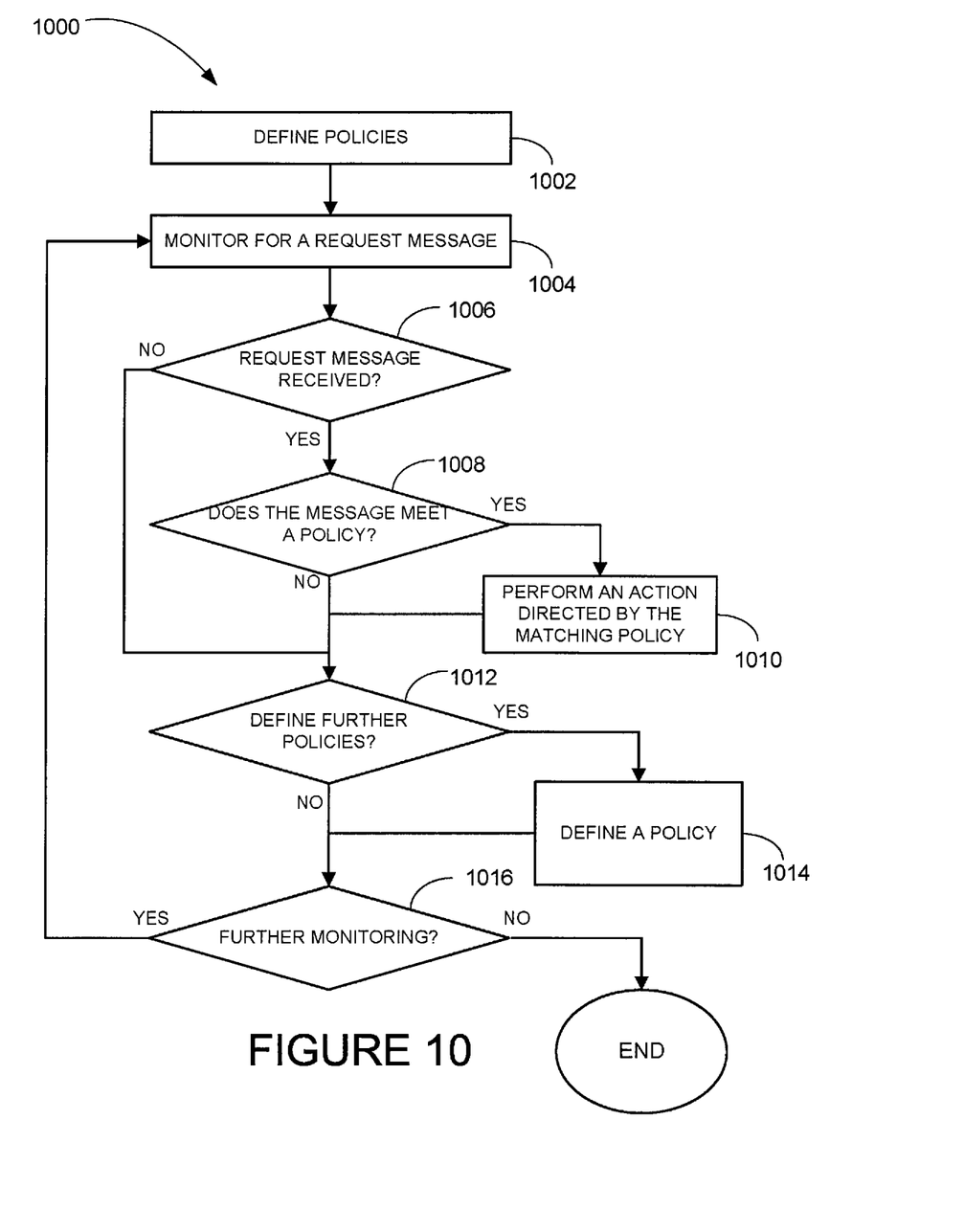
FIG. 10 is a flowchart illustrating a method for triggering in a virtual server environment.

Referring to FIG. 10, a method 1000 for triggering in a virtual server environment according to an example embodiment is described. In an example embodiment, the method 1000 may be implemented by a listener (e.g., a SOAP server) of the virtual frame director 62 (see FIG. 1).

One or more polices may be defined at block 1002. For example, each of the policies may be defined as the policy data structure 600 (see FIG. 1).

A request message (e.g., a trigger) may be monitored for receipt (e.g., listening may be performed) at block 1004. For example, the virtual frame director may have a listener (e.g., a SOAP server) to listen for request message such as may be in the form of the request message data structure 800 (see FIG. 8).

At decision block 1006, a determination may be made as to whether a request message has been received. If the request message has not received, the method 1000 may proceed to decision block 1012. If the message has been received at decision block 1006, the method 1000 may proceed to decision block 1008.

A determination may be made at decision block 1008 as to whether the message meets a policy (e.g., whether there is a matching policy). For example, if the policy is configured for CPU load and a message is received in the category CPU load, a value is compared to the value in the policy, to determine whether the request message meets the policy (e.g., a compared value exceeds a threshold). If the request message meets a policy, an action directed by the matching policy is performed at block 1010. If the request message does not meet a policy at decision block 1008 or upon completion of the operations at block 1010, the method 1000 may proceed to decision block 1012.

At decision block 1012, a determination may be made as to whether one or more further policies may be defined (or existing policies redefined). If a determination is made to further define policies, one or more policies may be defined (or re-defined) at block 1014. If a determination is made not to further define policies at decision block 1016 or upon completion of the operations at block 1014, the method 1000 may proceed to decision block 1016.

A determination may be made at decision block 1016 whether further monitoring should be performed for additional messages. If a determination is made that further monitor is to be performed, the method 1000 may return to block 1004. If a determination is made that further monitoring is not to be performed at decision block 1016, the method 1000 may terminate.

In an example embodiment, the third party management tool 65 (see FIG. 1) may perform application patching, monitoring, data analysis, and/or statistics. For example, monitoring may monitor the servers and page an administrator to advise that a server is down. Without implementation of the methods 900 and 1000, the third party management tool 65 may receive superfluous notifications with regard to the virtual servers (e.g., the administrator may receive a page that a server has gone down when it actually has been taken down according to policy).

In an example embodiment, a policy set may include monitoring of a server so that the third party management tool 65 can monitor the server.

In an example embodiment, the implementation of the methods 900 and 1000 may enable coordination with a third party application and/or third parties to enable significant pages to be provided to an administrator and avoid undesired notifications. The use of policies may enable monitoring of resources (e.g., at an application level and other system level) that might not otherwise be monitored. For example, the use of policies may assist in avoid superfluous paging during patching.

Referring to the third party management tool 65 (see FIG. 1), assume for example that the third party management tool 65 requires a larger part of any policy making decision regarding the provisioning of virtual servers, and decides to add and/or remove resources. The virtual frame director 62 can set a policy which monitors messages from one or more third party applications (e.g., one or more third party application tools) and may match some criteria or policy rules to the message. In an embodiment a policy engine may be provided for all the virtual server groups (e.g., server groups or pools 20.1-20.3). For example, a policy may define the removal and addition of resources a certain time of day. An example policy may monitor incoming messages. For example, if an incoming message is indicative of a high load, one or more physical servers may be added to the group of virtual servers that service that load.

An example application of the methodologies described herein to accomplish load balancing may be as follows. Assume that the system 10 hosts the web site of a Broker such as Charles Schwab. It will be appreciated that the web site may experience a high level of traffic during the day when trading is open and a reduced level of traffic at night when trading is closed. The web site may utilize an application such as IBM Tivoli Storage Manager which defines policy and which, optionally, may control provisioning policy of the system 10. Thus, a Tivoli-type tool may have the time of day policy directing the addition or removal of resources. The system 10 may thus allow automatic or manually provision of resource using SOAP messages.

In an example embodiment, services of the virtual frame director 62 may leverage a Web Services Description Language (WSDL)-based code generating tool from a selected SOAP implementation to generate the stubs and skeletons.

Figure 11:
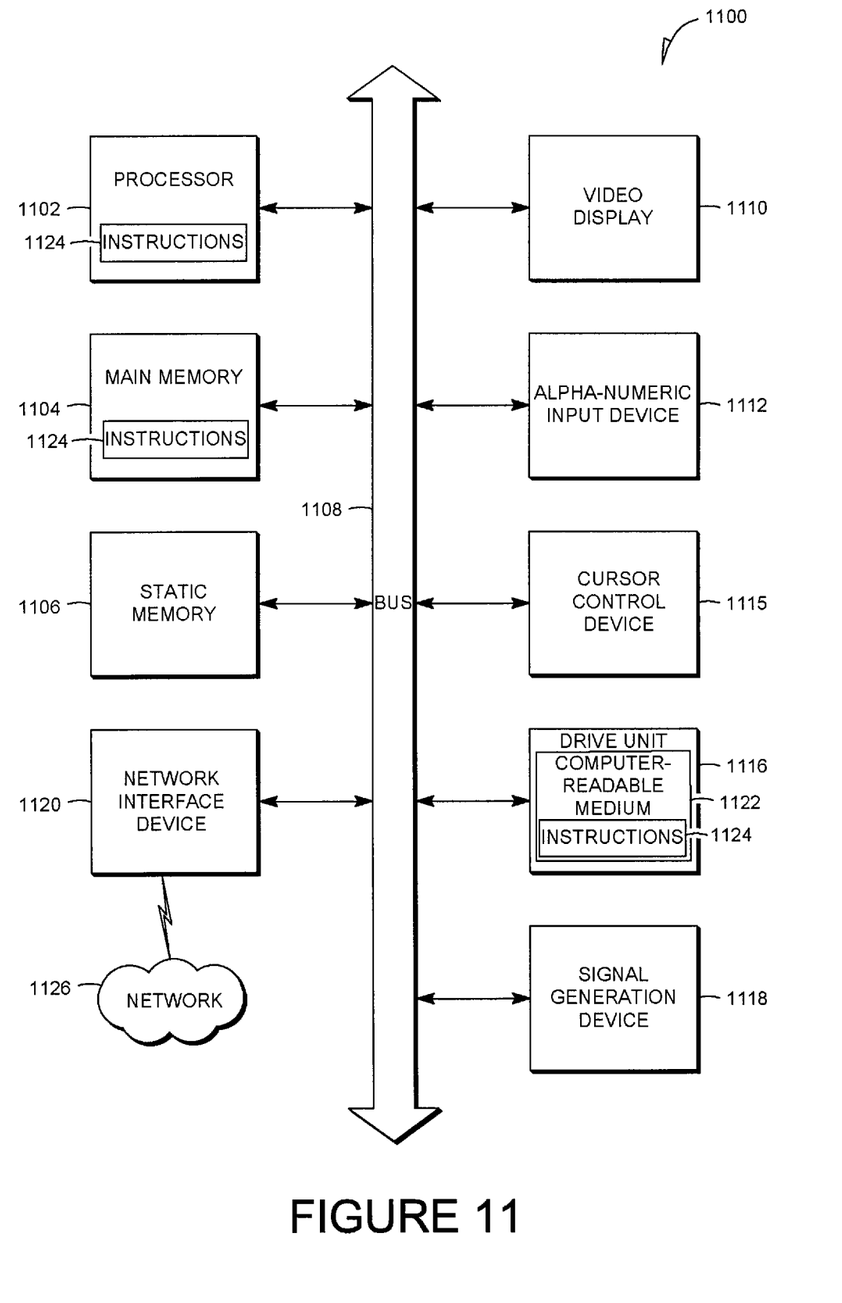
FIG. 11 shows a diagrammatic representation of machine in the example form of a computer system within which a set of instructions, for causing the machine to perform any one or more of the methodologies discussed herein, may be executed.

FIG. 11 shows a diagrammatic representation of machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   a virtual frame director implemented by one or more processors and operative to:
      determine that a request message does not meet a policy;
      determine whether to generate one or more new policies responsive to the determination that the request message does not meet the policy and, if so, generate the one or more new policies based on user input;
      receive association data regarding a virtual server and a physical server,
      send instructions to a management module based on the received association data,
      send a control command to the physical server based on the received association data, and
      send a notification regarding completion of an association between the virtual server and the physical server; and
   a management module implemented by one or more processors and operative to configure at least one of the virtual server and a gateway according to the instructions received from the virtual frame director,
   the policy for defining the association data to be received by the virtual frame director when the request messages meets the policy, wherein the policy comprises
      a category input for receiving a variable name that is being monitored;
      a type input for receiving instructions on how to evaluate data in the request message;
      a threshold input for receiving a threshold value;
      an operator input for defining how the request message should be compared to a threshold value of the threshold input;
      an action input for defining an action to be made when specified criteria of the policy are met; and
      a description input for user reference in a user interface;
   wherein the policy is represented by a policy data structure having a plurality of fields, each comprising a corresponding one of the inputs.

2. The system of claim 1, wherein the association is a virtual server to the physical server association.

3. The system of claim 2, wherein the association is a virtual server to the physical server disassociation.

4. The system of claim 1, further comprising:
   a third party management tool operative to:
   receive the notification, and
   perform at least one of application patching, monitoring, data analysis, or statistics based on the receipt of the notification.

5. The system of claim 1, further comprising:
   the user interface for receiving an assignment change and providing the association data to the virtual frame director.

6. The system of claim 1, wherein the policy is a Simple Object Access Protocol (SOAP) trigger based policy.

7. The system of claim 1, wherein the notification comprises:
   a virtual server name input for receiving a virtual server name associated with the notification;
   a physical server name input for receiving a physical server name associated with the notification;
   an internet protocols (IPs) input for receiving an array of IP interfaces for a virtual server or a name corresponding to an alias listed in a user interface; and
   an assigned input to indicate if the physical server associated with the notification has been assigned or unassigned.

8. The system of claim 1, further comprising:
   the physical server booting up or powering down in response to the control command received from the virtual frame director.

9. The system of claim 1, wherein the association data indicates at least one of an addition or a removal of a virtual server to a virtual server group.

10. The system of claim 1, wherein the virtual frame director is further configured to:
    determine whether to redefine one or more existing policies responsive to the determination that the request message does not meet the policy and, if so, redefine the one or more existing policies based on the user input.

11. A system comprising:
    a virtual frame director implemented by one or more processors and operative to:
       receive a request message for a virtual server,
       determine that the request message does not meet a policy implemented in the virtual frame director, and
       determine whether to generate one or more new policies responsive to the determination that the request message does not meet the policy and, if so, to generate the one or more new policies based on user input,
    wherein the request message comprises:
       a virtual server group (VSG) name input for receiving a name of a virtual server group for which the request message is directed;
       a category input for receiving a category of the request message;
       a message value input for receiving a current value for the category input; and
       a name of a specific physical server and/or a name of a specific virtual server;

wherein the virtual frame director is further operative to:
- receive association data regarding a virtual server and a physical server,
- send instructions to a management module based on the received association data,
- send a control command to the physical server based on the received association data, and
- send a notification regarding completion of an association between the virtual server and the physical server; and a management module implemented by one or more processors and operative to configure at least one of the virtual server and a gateway according to the instructions received from the virtual frame director.

12. The system of claim 11, wherein the action is at least one of sending an email, adding at least one of a physical server or the virtual server, removing at least one of the physical server, or the virtual server, failover, rebooting the physical server, or setting a virtual server state of the virtual server.

13. The system of claim 11, wherein the policy comprises:
- a type input for receiving instructions on how to evaluate data in the request message;
- a threshold input for receiving a threshold value;
- an operator input defining how the request message should be compared to a threshold value of the threshold input; and
- an action input defining the action to be made when specified criteria of the policy are met.

14. The system of claim 11, wherein the virtual frame director is further operative to:
associate the request message with a virtual server group (VSG) according to the policy.

15. The system of claim 11, wherein the request message is a Simple Object Access Protocol (SOAP) based trigger.

16. An apparatus comprising a virtual frame director implemented by one or more processors and configured to:
- receive association data;
- send instructions to a management module based on the received association data;
- send a control command to one or more physical servers based on the received association data;
- send a notification regarding completion of an association from the association data;
- receive a request message for a virtual server, wherein the request message comprises:
  - a virtual server group (VSG) name input for receiving a virtual server group for which the request message is directed;
  - a category input for receiving a category of the request message;
  - a message value input for receiving a current value for the category input;
  - a name of a specific physical server and/or a name of a specific virtual server;
- determine that the request message does not meet a policy implemented in a virtual frame director,
- determine whether to generate one or more new policies responsive to the determination that the request message does not meet the policy; and
- generate the one or more new policies based on user input.

17. A method comprising:
receiving a trigger comprising a category field value;
determining that the trigger does not meet a policy;
determining, using one or more processors, whether to generate one or more new policies responsive to the determination that the trigger does not meet the policy and, if so, generating the one or more new policies based on user input;
accessing association data regarding an association between a virtual server and a physical server;
providing instructions to a management module based on the received association data;
providing a control command to the physical server based on the received association data;
providing a notification regarding completion of the association between the virtual server and the physical server, wherein the association is a virtual server to physical server association; and
providing the association data for access when the category field value of the trigger matches a category field value of a policy data structure corresponding to the policy.

* * * * *